United States Patent [19]

Stucky

[11] Patent Number: 4,883,306

[45] Date of Patent: Nov. 28, 1989

[54] DECK FOR MOBILE HOMES

[75] Inventor: Michael E. Stucky, Attica, Kans.

[73] Assignee: E Z Dek, Inc., Fort Scott, Kans.

[21] Appl. No.: 94,516

[22] Filed: Sep. 9, 1987

[51] Int. Cl.⁴ ............................................... B60R 15/00
[52] U.S. Cl. ........................................ 296/162; 52/143
[58] Field of Search ................. 296/162, 163; 52/79.6, 52/67, 143; 14/73; 114/263, 344

[56] References Cited

U.S. PATENT DOCUMENTS

| | | | |
|---|---|---|---|
| 2,831,203 | 4/1958 | Kanarr | 114/344 |
| 3,515,406 | 6/1970 | Endsley, Jr. | 296/162 |
| 3,789,558 | 2/1974 | Spencer et al. | 52/143 |
| 4,413,855 | 11/1983 | Flanagan | 296/162 |

Primary Examiner—Joseph F. Peters, Jr.
Assistant Examiner—Jesus D. Sotelo
Attorney, Agent, or Firm—Kokjer, Kircher, Bradley, Wharton, Bowman & Johnson

[57] ABSTRACT

A deck for a mobile home is supported on the undercarriage of the mobile home to roll in and out between a retracted position in which the deck is wholly located beneath the mobile home and an extended position in which the deck extends laterally from the mobile home. Channels secured to the frame of the mobile home receive wheels on opposite sides of the deck. The deck has fold up rollers on its leading end which roll along the ground and elevate the deck above the ground. Each roller is carried on a leg which is adjustable in its length.

10 Claims, 2 Drawing Sheets

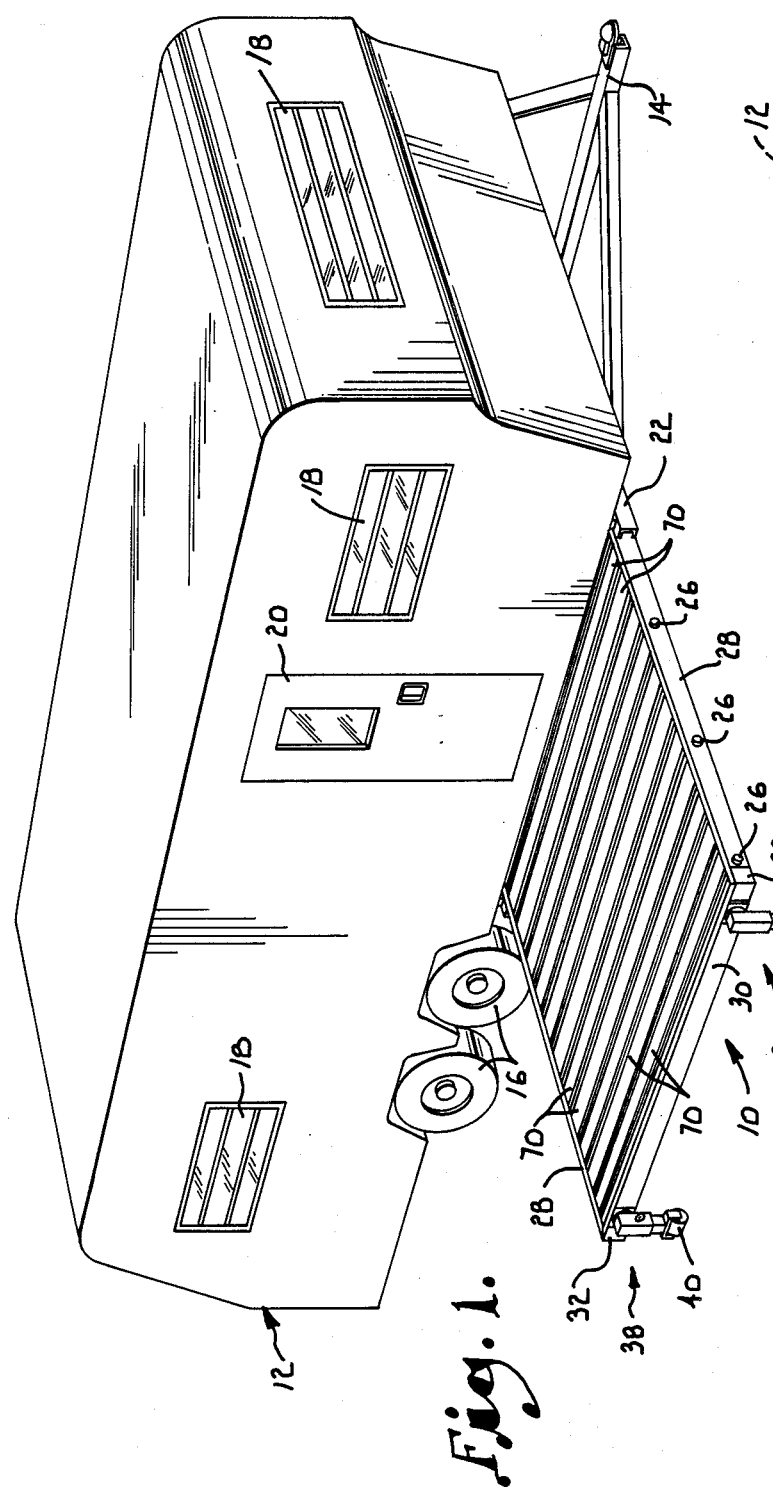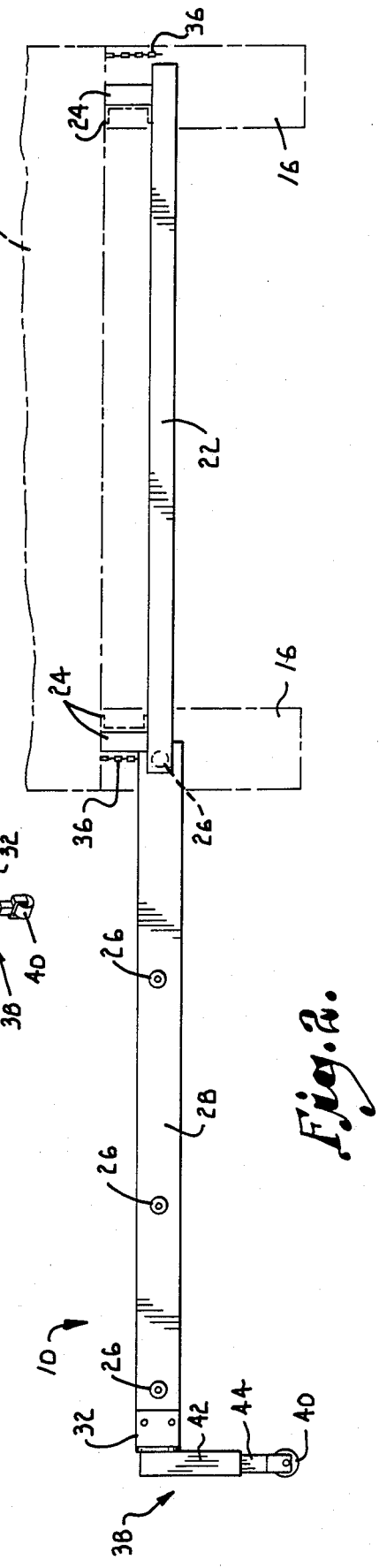

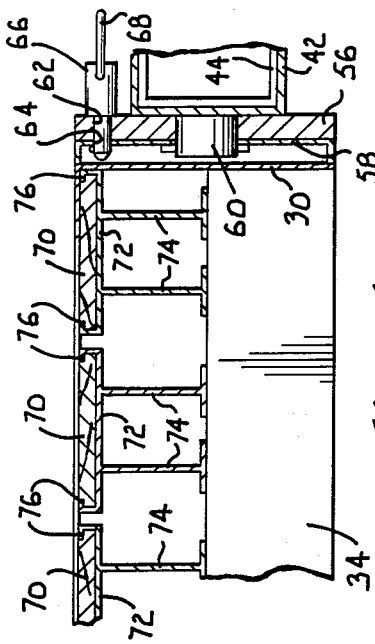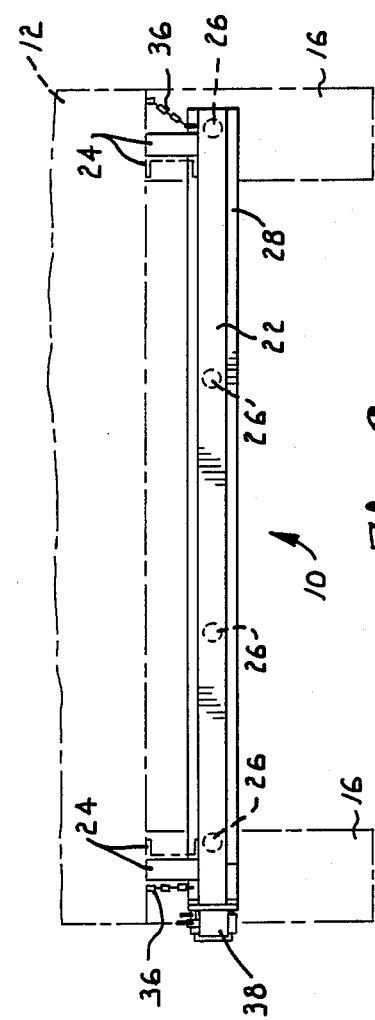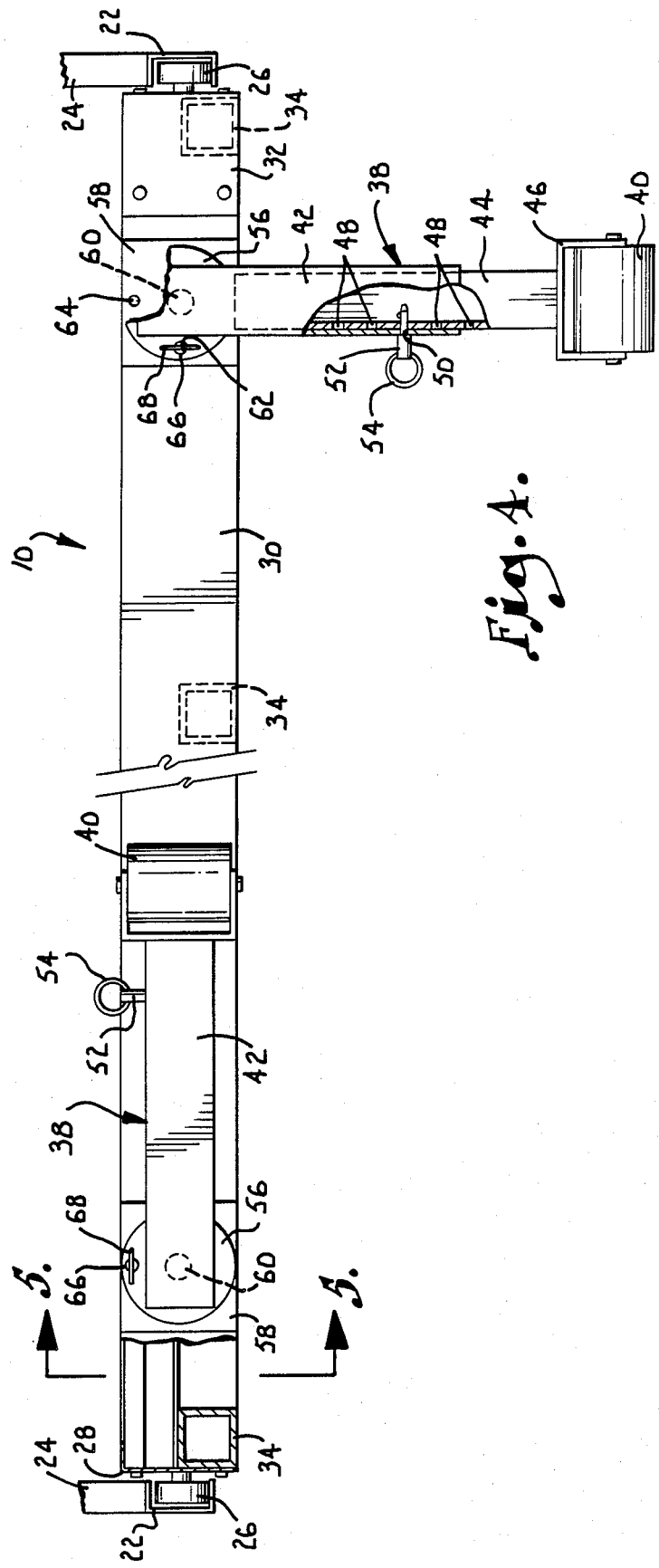

DECK FOR MOBILE HOMES

BACKGROUND AND SUMMARY OF THE INVENTION

This invention relates to a roll out deck attachment for a mobile home or trailer. "Mobile home" is intended herein to mean a vehicle for providing living accommodations such as RVs, travel trailers, motor homes and the like.

In accordance with the invention, a deck platform may be rolled in and out from beneath a mobile home, e.g. of the type which may be towed over the road. When rolled out, the platform provides a deck on one side of the mobile home which can be used by the occupants and others as a patio or porch. When retracted, the deck is carried on the underside of the mobile home and may travel over the road without adding width or otherwise detracting from the ability of the mobile home to be safely towed.

The special mounting arrangement for the deck is a particular feature of the invention. A pair of channels are suitably secured to the underside of the frame of the mobile home and serve as tracks which receive wheels carried on opposite sides of the deck platform. This provides smooth rolling action which allows the deck to be manually rolled in and out without undue difficulty and without the need for special tools or equipment. Safety chains secure the deck in both its extended and retracted positions to prevent the deck from accidentally rolling in or out.

Another important feature of the invention is the provision of specially constructed roller assemblies on the leading end of the deck. The rollers are carried on legs which support the leading end of the deck above the ground and add to the ease with which the platform can be rolled in and out. Each leg includes two telescoping sections which permit the length of the leg to be adjusted so that the deck can be leveled even when it is used on sloping or otherwise uneven terrain. The legs also swing up to a storage position in which they are raised well above the ground so that the mobile home can travel over the road without impairment caused by the rollers.

The platform has a construction which provides wooden planks on the deck surface and yet offers the strength of a metal framework. The frame is constructed of metal tubes and angles and also includes a plurality of side by side channels which are open at the top. The wooden deck planks can be slid into the channels to form a nearly continuous wooden deck surface. Thus, the mobile home owner can enjoy a wooden deck without detracting appreciably from the mobility of the mobile home.

DESCRIPTION OF THE DRAWINGS

In the accompanying drawings which form a part of the specification nd are to be read in conjunction therewith and in which like reference numerals are used to indicate like parts in the various views:

FIG. 1 is a perspective view of a mobile home which is equipped with a roll out deck constructed according to a preferred embodiment of the present invention, with the deck rolled out to its extended position;

FIG. 2 is an elevational view taken from the front of the mobile home on an enlarged scale and showing the deck in its extended position;

FIG. 3 is a front elevational view similar to FIG. 2, but showing the deck retracted to its storage position beneath the mobile home;

FIG. 4 is a fragmentary side elevational view on an enlarged scale showing the leading end of the roll out deck, with portions broken away and other portions shown in section for illustrative purposes and the break lines indicating continuous length, one roller assembly being disposed in the vertical operating position and the other roller assembly being disposed in the horizontal storage position; and FIG. 5 is a fragmentary sectional view on an enlarged scale taken generally along line 5—5 of FIG. 4 in the direction of the arrows.

DETAILED DESCRIPTION OF THE INVENTION

Referring now to the drawings in more detail and initially to FIG. 1, the present invention is directed to a roll out deck which is generally designated by reference numeral 10 and which may be installed on a trailer type mobile home 12. The mobile home or trailer may be of any suitable type and includes a hitch 14 on its front end which allows it to be towed over the road by a suitable towing vehicle (not shown). The mobile home includes wheels 16, windows 18, and a door 20 on one side.

Referring additionally to FIGS. 2-4, the mounting arrangement for deck 10 includes a pair of spaced apart metal channels 22 which are mounted to frame members 24 on the underside of the mobile home 12. The channels 22 are parallel to one another and extend across substantially the entire width of the mobile home. The channels 22 open inwardly and receive wheels 26 which are mounted on opposite sides of the deck 10.

The deck 10 is formed by a rectangular platform having a rigid metal frame which includes parallel angles 28 on opposite sides of the deck. The angles 28 on the sides of the deck are connected at their ends with additional angle members 30 which extend along the leading end of the deck and along its trailing end. The four corners of the frame may be reinforced by corner braces 32. A plurality of square tubes 34 extend in spaced relation to one another between the angle members 30 on the leading and trailing ends of the deck frame. The wheels 26 are spaced apart from one another along the angle members 28 on the opposite sides of the deck. Preferably, each side of the deck has one wheel adjacent the leading end of the deck, one wheel adjacent the trailing end, and a pair of additional wheels spaced between the leading and trailing rollers. Each of the wheels 26 is connected with the frame in a manner allowing it to rotate, and the wheels are received within and roll along the channels 22, as best shown in FIG. 4.

The two channels 22 provide tracks on the underside of the mobile home 12 on which the wheels 26 ride so that the deck 10 can move between the retracted position shown in FIG. 3 and the extended position shown in FIG. 2. In the retracted position, the deck is located wholly beneath the mobile home 12 adjacent to its underside so that the mobile home can be towed over the road without the deck adding to its width or otherwise interfering with its mobility. In the extended position, the deck 10 extends laterally from the mobile home 12, preferably at a location beneath the door 20. The leading end of the deck is located well away from the side of the mobile home in the extended position of the deck, and the wheels 26 which are carried on the trailing portion of the deck are then the only wheels which are located within the channels 22. These wheels maintain the trailing end of the deck well above the ground.

A pair of safety chains 36 are secured to the frame of the mobile home adjacent to each of its sides. Each chain 36 may be connected with the adjacent side of the deck by a suitable quick release fastener carried on the deck (not shown). Thus, all four chains 36 may be connected with the deck 10 in the retracted position of the deck, and the safety chains then prevent the deck from accidentally rolling out from the retracted position. As shown in FIG. 2, the two chains 36 on one side of the mobile home 12 may be connected with the trailing end portion of the deck in the extended position in order to prevent the trailing pair of wheels 26 from rolling completely out of the channels 22. Alternatively, suitable stops (not shown) may be provided to retain the trailing wheels 26 in the channels 22.

The leading end of deck 10 is provided with a pair of identical roller assemblies which facilitate rolling of the deck between the extended and retracted position and which maintain the leading end of the deck above the ground. As best shown in FIG. 4, each roller assembly includes a leg 38 which is connected with angle member 30 at one end and which carries a roller 40 on the opposite end. Each leg 38 includes an upper square tube 42 and a lower square tube 44 which fits telescopically within the upper tube 42. The bottom end of each tube 44 carries a U-shaped bracket 46 to which the roller 40 is connected in a manner allowing the roller to rotate. The inside tube 44 of each leg may be axially extended and retracted within the outside tube 42, and this adjusts the overall length of the leg 38. The inside tube 44 is provided on one side with a plurality of spaced apart openings 48 which align at different positions of the inside tube with an opening 50 formed in the outside tube 42. A pin 52 may be inserted through the aligned openings 48 and 50, and this locks the two tubes 42 and 44 together at whatever length of the leg is selected. Pin 52 may be removed to permit the leg to be adjusted to a different length and inserted again in the newly aligned openings to fix the length of the leg. Each pin 52 has a ring 54 on its end to facilitate its handling.

Each leg 38 is mounted on the leading end of the deck in a pivotal manner allowing the leg to be swung through a 90° arc between the vertical operating position shown for the right hand leg in FIG. 4 and the horizontal storage position shown for the left hand leg in FIG. 4. The upper tube 42 of each leg is connected at one end with a disk 56 which, as best shown in FIG. 5, is pivotally connected with a mounting bracket 58 by a pivot pin 60. Each mounting bracket 58 is in turn suitably secured to the angle member 30 on the leading end of the deck. The two brackets 58 are located near the opposite sides of the deck so that the roller assemblies are likewise located near the opposite sides of the deck.

Each leg 38 may be locked in its operating position and in its storage position. Each disk 56 is provided with an opening 62. Each mounting bracket 58 is provided with a pair of openings 64 which are spaced 90° apart from one another. The upper opening 64 in each bracket is located to align with opening 62 when the leg 38 is swung upwardly to the horizontal storage position. A pin 66 may then be inserted through the aligned openings 62 and 64 in order to lock the leg 36 in the storage position. The leg then lies generally along the outer face of the angle member 30 and does not project appreciably below the frame of the deck. The other opening 64 in each bracket 58 is located to align with opening 62 when the leg 38 is in the vertical position. Again, pin 66 can be inserted through the aligned openings in order to lock the leg in the vertical position. Each pin 66 preferably has a ring 68 which facilitates handling of the pin. Preferably, the lower tube 44 of each leg is fully retracted within the upper tube 42 in the storage position of the leg. Each pin 66 may be removed from the aligned openings in order to unlock the leg and allow it to be swung from one position to the other.

The upper surface of the deck 10 is provided by a plurality of wooden planks 70. As best shown in FIG. 5, the planks 70 slide into channels 72 which are each open at the top and are supported on a plurality of T-shaped legs 74 having their bases secured to the square tubes 34 of the frame. The channels 72 extend parallel to and side by side with one another between the angles 28 located on opposite sides of the deck frame. The planks 70 thus extend across the entire width of the deck 10 and are spaced closely apart from one another to simulate the deck surface of a wooden deck. Each channel 72 has inturned lips 76 on its opposite side edges, and the lips 76 retain the deck planks 70 in place in the channels.

The roll out deck 10 can be provided either as original equipment when the mobile home 12 is originally manufactured or as an after market add on. Installation of the deck is carried out by first mounting the channels 22 and the safety chains 36 to the undercarriage of the mobile home. The deck 10 can then be installed by sliding the wheels 26 into the tracks provided by channels 22.

In use, the deck 10 is fully retracted beneath the mobile home 12 when the mobile home is being towed over the road or in other instances where the deck is not desired for use. In the retracted position of the deck, all of the wheels 26 on each side are located within the channels 22, and the rollers by themselves support the deck well above the ground against the underside of the mobile home 12. This allows both legs 38 to be folded up and secured in their horizontal storage positions so that they do not project significantly below the deck 10, thus avoiding any way interfering with over the road travel of the mobile home. The safety chains 36 are all preferably attached so that the deck 10 can not accidentally roll out. Other types of locking devices may also be used to lock the deck in its retracted position.

The deck may be rolled out to its extended position by first swinging both legs 38 downwardly to their vertical positions and locking them in the vertical positions by insertion of the locking pins 66. Each of the lower tubes 44 is preferably extended far enough out of the upper tube 42 to provide each leg 38 with an overall length sufficient to maintain the deck in a level condition. The deck 10 may then be rolled out, with the rolling action provided by wheels 26 in channels 22 and by the rollers 40 along the ground facilitating rolling out of the deck. The deck can normally be rolled out without undue difficulty and without the need for any power equipment. The deck may be rolled out as far as desired and need not always be rolled out to the fully extended position. However, the maximum size of the deck is presented in the fully extended position, and it will normally be fully extended. In the fully extended position, only the two trailing wheels 26 remain within the channels 22, and they support the trailing end of the deck above the ground. The legs 38 and rollers 40 support the leading end of the deck above the ground at the desired height. It is preferred that the legs 38 be adjusted to the proper length to maintain the deck surface provided by the wooden planks 70 in a substantially level condition when the deck is fully extended.

The deck can be easily retracted by pushing it inwardly, and again the wheels 26 and rollers 40 provide rolling action which reduces the effort needed to retract the deck. Once the deck has been fully retracted, all four of the safety chains 36 can be applied and the two legs 38 may be retracted and folded up to their storage positions.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. A deck for attachment to the underside of a mobile home, said deck comprising:
   a platform presenting a generally horizontal deck surface and having a leading edge; and
   means for mounting said platform on the underside of the mobile home in a manner permitting the platform to move between a retracted position wherein the platform is substantially beneath the underside of the mobile home and an extended position wherein the platform extends laterally from the mobile home with said leading end spaced away from same, said platform comprising a plurality of wooden deck planks; and
   a rigid frame presenting thereon a plurality of parallel channels each open at the top and each having a size and shape to receive and retain one of the deck planks therein with the planks cooperating to provide a substantially continuous and generally horizontal deck surface.

2. A roll out deck for installation on the underside off a mobile home, said deck comprising:
   a platform presenting a generally horizontal deck surface and having leading and trailing end portions and opposite sides;
   a pair of tracks adapted for attachment to the underside of the mobile home parallel to and spaced apart from one another, each track comprising a channel having an elongated opening facing said platform outboard of the latter;
   a pair of wheel and axle assemblies on the opposite sides of said platform adjacent said trailing end portion thereof, said axles projecting outwardly from their corresponding sides of the platform with the respective wheels disposed inside the corresponding channels so that the wheels roll on the tracks to accommodate movement of the platform between a retracted position wherein the platform underlies the mobile home and an extended position wherein the platform extends laterally from the mobile home with the leading end portion of the platform spaced away from the mobile home; and
   a pair of ground engaging rollers on said leading end portion of the platform extending below the platform for rolling contact with the ground during movement of the platform between the retracted and extended positions.

3. The deck of claim 2, including a plurality of legs on said leading end portion of the platform, said legs carrying the respective rollers thereon.

4. The deck of claim 3, including means for adjusting the length of each leg.

5. The deck of claim 3, wherein said platform is substantially planar and includes:
   means for mounting each leg on the platform for pivotal movement between a vertical operating position and a horizontal storage position in the plane of said platform; and
   releaseable means for locking each leg in its vertical operating position.

6. The deck of claim 2, including a plurality of additional wheel and axle assemblies on each side of the platform, said assemblies being spaced apart along each side of the platform, the wheels of each assembly being disposed within the corresponding channels to roll on the tracks to accommodate movement of the platform between said retracted and extended positions.

7. The deck of claim 6, including means for releasably locking the platform in said retracted position.

8. A deck for a mobile home, comprising;
   a plurality of wooden deck planks;
   a rigid frame presenting thereon a plurality of generally side by side open topped channels having sizes and shapes to receive and retain said deck planks therein with the planks cooperating to provide a deck surface, said frame having a leading end and a trailing end;
   means for mounting said frame on the mobile home for movement between a retracted position wherein the frame is retracted beneath the mobile home and an extended position wherein the frame extends laterally from the mobile home with said deck surface having a generally horizontal orientation, said mounting means maintaining the trailing end of the frame above the ground in both positions; and
   leg means on said frame adjacent the leading end thereof for maintaining the leading end of the frame above the ground in the extended position of the frame.

9. The deck of claim 8, wherein said mounting means comprises cooperating track and wheel means on the mobile home and frame, said track and wheel means comprising a track and a wheel riding on the track during movement of the frame between the retracted and extended positions.

10. The deck of claim 9, including a ground engaging roller on said leg means for rolling contact with the ground during movement of the frame between the retracted and extended positions.

* * * * *